US005930243A

United States Patent [19]

Parish et al.

[11] Patent Number: 5,930,243
[45] Date of Patent: Jul. 27, 1999

[54] METHOD AND APPARATUS FOR ESTIMATING PARAMETERS OF A COMMUNICATION SYSTEM USING ANTENNA ARRAYS AND SPATIAL PROCESSING

[75] Inventors: David M. Parish, Los Altos; Alain M. Chiodini, Mountain View; Craig H. Barratt, Redwood City; Kamaraj Karuppiah, Sunnyvale, all of Calif.

[73] Assignee: ArrayComm, Inc., San Jose, Calif.

[21] Appl. No.: 08/729,386

[22] Filed: Oct. 11, 1996

Related U.S. Application Data

[51] Int. Cl.⁶ .............................. H04Q 7/00; H04J 3/06
[52] U.S. Cl. ........................ 370/334; 375/347; 455/562
[58] Field of Search ................... 375/346, 326, 375/349, 324, 347, 262, 200, 277, 209; 370/252, 206, 310, 320, 516, 350, 67.7; 455/101, 102, 103, 115, 124, 125, 150.1, 160.1, 161.2, 182.2, 193.1, 296, 225, 226.1, 132, 561, 562; 379/406

[56] References Cited

U.S. PATENT DOCUMENTS

| 5,335,249 | 8/1994 | Krueger et al. | 375/1 |
|---|---|---|---|
| 5,361,303 | 11/1994 | Eatwell | 381/71 |
| 5,515,378 | 5/1996 | Roy, III et al. | 370/334 |
| 5,537,438 | 7/1996 | Mourot et al. | 375/231 |
| 5,566,209 | 10/1996 | Forssen et al. | 375/262 |
| 5,592,490 | 1/1997 | Barratt et al. | 370/310 |
| 5,621,752 | 4/1997 | Antonio et al. | 375/200 |
| 5,638,375 | 6/1997 | Dettro et al. | 370/324 |
| 5,673,291 | 9/1997 | Dent | 375/331 |
| 5,684,836 | 11/1997 | Nagayasu et al. | 375/347 |
| 5,689,502 | 11/1997 | Scott | 370/509 |
| 5,694,416 | 12/1997 | Johnson | 375/347 |
| 5,809,019 | 9/1998 | Ichihara et al. | 370/334 |

OTHER PUBLICATIONS

Lee, E.A. et al., Chapter 16, "Carrier Recovery" 1994, *Digital Communications*, 2nd Edition, Kluwer Academic Publishers, pp. 725–736.

Lee, E.A. et al., Chapter 17, "Timing Recovery" 1994, *Digital Communications*, 2nd Edition, Kluwer Academic Publishers, pp. 737–764.

Franks, L.D. "Synchronization Subsystems: Analysis and Design," 1981, *Digital Communications: Satellite/Earth Station Engineering*, Prentice–Hall., pp. 294–335.

*Primary Examiner*—Wellington Chin
*Assistant Examiner*—Chi ho Andrew Lee
*Attorney, Agent, or Firm*—Townsend and Townsend and Crew LLP; Henry K. Woodward

[57] ABSTRACT

A method and apparatus for estimating the parameters of a wireless communication system which includes at least one base station and at least one remote terminal, each of the base stations having m antenna elements, the parameters being one or more of: the time alignment; the frequency offset; and the weight vector for spatial processing. At any stage, some of the parameters may already be estimated. A signal of known characteristics is transmitted and received as m received signals at the antenna elements. A cost function that is related to the at least one or more parameters of the second set is determined using a copy signal determined from samples of the received signals, estimates of one or more parameters, if available, known characteristics of transmitted first signal. The estimate of the parameters to be determined is obtained by minimizing the cost function.

52 Claims, 7 Drawing Sheets

FIG. 1

| R | SS | PREAMBLE | UW | CI | CdSIC | CgSIC | UIB | CRC |
|---|----|----------|----|----|-------|-------|-----|-----|
| 4 | 2  | 62       | 32 | 4  | 42    | 28    | 34  | 16  |

R: Ramp Time
SS: Start Symbols
UW: Unique World
CI: Channel Identifier
CgSIC: Called Station Identification Code
CgSIC: Called Station Identification Code
UIB: Uplink Idle Bits
CRC: Cyclic Redundancy Check

FIG. 5 ated Demodula-
METHOD AND APPARATUS FOR ESTIMATING PARAMETERS OF A COMMUNICATION SYSTEM USING ANTENNA ARRAYS AND SPATIAL PROCESSING

CROSS-REFERENCE TO RELATED APPLICATIONS

This application is related to the concurrently filed, co-owned, and co-pending patent application entitled "Method and Apparatus for Decision Directed Demodulation Using Antenna Arrays and Spatial Processing" Ser. No. 08/729,390 filed Oct. 11, 1996 incorporated herein by reference, and hereinafter referred to as "Our Demodulation Invention."

I. BACKGROUND OF THE INVENTION

A. Field of the Invention

The field of the present invention is wireless (radio) communications. In particular, the field is using antenna arrays and spatial signal processing in wireless communications systems to determine parameters of a communication system such as frequency offset, time alignment and an initial weight vector for spatial processing.

B. Background

Wireless communications systems

Users of a wireless communications system typically access the system using remote terminals such as cellular telephones and data modems equipped with radio transceivers. Such systems generally have one or more radio base stations, each of which provides coverage to a geographic area known as a cell. The remote terminals and base stations have protocols for initiating calls, receiving calls, and general transfer of information.

In such a system, an allocated portion of the spectrum is divided up into communication channels which may be distinguished by frequency, by time, by code, or by some combination of the above. Each of these communication channels will be referred to herein as a conventional channel. To provide full-duplex communication links, typically some of the communication channels are used for communication from base stations to users' remote terminals (the downlink), and others are used for communication from users' remote terminals to base stations (the uplink). Within its cell, a radio base station can communicate simultaneously with many remote terminals by using different conventional communication channels for each remote terminal.

We have previously disclosed spatial processing with antenna arrays to increase the spectrum efficiency of such systems. See U.S. patent applications: Ser. No. 07/806,695 filed Dec. 12, 1991, entitled Multiple Access Wireless Communications Systems (also U.S. Pat. No. 5,515,378 issued May 7, 1996); Ser. No. 08/234,747, filed Apr. 28, 1994, entitled Method and Apparatus for Calibrating Antenna Arrays (now U.S. Pat. No. 5,546,909 issued Aug. 13, 1996); Ser. No. 08/283,470, filed Aug. 1, 1994, entitled Spectrally Efficient and High Capacity Acknowledgment Radio Paging System; and Ser. No. 08/375,848, filed Jan. 20, 1995, entitled Spectrally Efficient High Capacity Wireless Communications Systems (collectively, "Our Co-pending Patent Applications"). The general idea is to increase the quality of communication by using an antenna array rather than a single antenna, together with processing of the signals received at the antennas. The antenna array also can be used to increase spectrum efficiency by adding spatial multiplexing to conventional channels so that several users can communicate simultaneously on the same conventional channel. We call this SDMA for spatial division multiple access. Thus, taking frequency division multiplexing (FDMA) as an example, with SDMA, several remote terminals may communicate with one or more base stations on a single cell on the same frequency channel, that is, on the same conventional channel. Similarly, with time division multiplexing (TDMA) and SDMA, several remote terminals may communicate with one or more base stations on a single cell on the same frequency channel and the same time slot, that is, on the same conventional channel. SDMA likewise also can be used with code division multiple access (CDMA).

Parameters of a Communication System

Frequency offset and time alignment

It is often required to estimate certain parameters of a communication system such as frequency offset and time alignment. The frequency offset problem can be described as follows. In a typical radio-frequency (RF) receiver, the original RF signal is mixed down using local frequency references, typically produced by crystal oscillators and/or frequency synthesizers, to produce a baseband signal whose phase and amplitude changes around in a predictable pattern determined by the modulation format. Ideally, the signal has no residual frequency offset component, such an offset due for example to frequencies of the local oscillators differing slightly from the frequency of the oscillators used in sending the signals. In the case of mobile communications transmitting from a handset to a base station, the frequency of the radio signal is produced by a local oscillator in the hand set, while the frequency references used for down-converting the signal are produced by different local oscillators in the base station. Although the base station local oscillators typically are very good, there still typically is frequency offset in the residual is signal. In order to increase system performance, it is desirable to estimate this frequency offset and correct for it, for example, in demodulation. Prior art techniques for frequency estimation include simple DC filtering of the incoming signal. Other prior art techniques include taking some high power of the incoming signal, for example the fourth power. As an example, with $\pi/4$ differential quaternary (or quadrature) phase shift keying ($\pi/4$ DQPSK), exponentiating the incoming signal to the power 4 gives all of the complex points in the constellation falling back on each other on the phase plane, and thus the DC value of the fourth power of the signal gives one an estimate of the frequency offset. The problem with these and other similar techniques is that they are not sufficiently robust in the face of noise or in the presence of significant amounts of interference on the signal input. In many situations, in particular in the case of cellular communications systems, the interference may be signals that are from other sources in the same communications system, so have the same modulation format. Such interference is one of a variety of possible interference from other signals on the same channel, so is called co-channel interference. Prior art techniques for estimating the frequency offset parameter do not in general work well when one has a low carrier to interference ratio (C/I) as is the case when one has strong co-channel interference.

In order to best demodulate digitally modulated signals, it is known that one needs to estimate the time alignment parameter of the incoming signal. This involves determining exactly when in time the incoming signal, viewed on the complex plane, passes through the constellation points. That is, it involves synchronizing the initial timing of the symbols in the signals received with the timing of the signals sent. There are a number of techniques in the prior art for performing time alignment estimation. Such techniques often use known training sequences that are incorporated in the burst of interest. These training sequences are chosen to have particular correlation (or convolution) properties. A correlation (or convolution) operation can then be used to determine timing offset, as is known in the art. The problem with such prior art techniques is that they do not perform well in the presence of high co-channel interference. Two references for prior art techniques for time alignment and for frequency offset correction/estimation are: 1) Chapter 16,"Carrier Recovery" and Chapter 17, "Timing Recovery" in E. A. Lee and D. G. Messerschmitt, *Digital Communications,* 2nd Edition, Kluwer Academic Publishers, 1994; and 2) L. E. Franks, "Synchronization Subsystems: Analysis and Design," in K. Feher (Ed.), *Digital Communications: Satellite/Earth Station Engineering, Prentice-Hall, Inc.,* 1983.

Thus, there is a need in the art for techniques for finding the time alignment and frequency offset parameters of a communication system that work well in the presence of strong co-channel interference.

Our Demodulation Invention, discloses a method and apparatus for improving reception and demodulation by augmenting the wireless communications system with multiple antennas, thereby introducing multiple versions of each signal, each of these versions comprising the composite of all the co-channel signals together with interference and noise. Our Demodulation Invention exploits the fact that the signal of interest has a particular modulation format by forcing estimates of signals of interest to more closely match the particular modulation format. Techniques of this nature sometimes are called decision directed or property restoral. Our Demodulation Invention in addition corrects for frequency offset and time alignment on an ongoing basis. Overall, it is designed to work well in the presence of strong co-channel interference. During establishing communications, Our Demodulation Invention uses an initial estimate of frequency offset and time alignment. Other communication systems that use arrays also require an initial estimate of frequency offset and time alignment.

Thus there is a need in the art for techniques for estimating the initial values of parameters of a communication system, such as the initial time alignment and initial frequency offset, that work well in the presence of strong co-channel interference and that are applicable to communication systems that use arrays of antennas.

Initial weight vector calculation

For communication systems that use arrays of antennas, another parameter that needs to be estimated is the initial weight vector defined below. Our Co-Pending Applications, Our Demodulation Invention, and other "smart antenna" techniques augment a wireless communications system with multiple antennas. In general m signals are received at m antennas. Spatial processing of the (complex valued) m signals at the m antennas comprises for each signal of interest determining a weighted sum of the antenna signals. The complex valued weights can be represented by a vector called herein a weight vector. The more general situation is that the received antenna signals need also to be temporally equalized, and in that situation, rather than a weighted sum, for each signal of interest, a sum of convolutions of the antenna signals is determined. That is, the weight vector is generalized, for the linear time invariant equalization situation, to a vector of complex valued impulse responses. For the purposes of this invention, the term weight vector shall apply either to a vector of complex weights or to a vector of impulse responses, depending on whether equalization is included.

Our Co-Pending Applications, Our Demodulation Invention, and other "smart antenna" techniques use a variety of methods to determine the weight vector on an ongoing basis. In each of these, the initial weight vector, a parameter of the system, also needs to be determined, and several methods have been proposed in the prior art for such initial weight determining. These include using ESPRIT or MUSIC to determine spatial signatures, then using these to determine the initial weight. It also includes maximum ratio combining and (3) principal component copy techniques, and using such techniques gives a starting weight that causes convergence upon the strongest signal. Thus, if the goal is to always pick out the strongest signal from a set of interferers, then such techniques work fine. However, such prior art techniques do not in general work well when one has a low carrier to interference ratio (C/I) as is the case when one has strong co-channel interference.

Thus, there is a need in the art for techniques for estimating the initial value of the initial weight vector parameter of a communication system with an antenna array that work well in the presence of strong co-channel interference.

II. SUMMARY OF THE INVENTION

A. Objects of the Invention

An object of the present invention is to provide a method and apparatus for estimating the time alignment and frequency offset parameters of an antenna-array based communications system that work well in the presence of strong co-channel interference.

Another object of the present invention is to provide a method and apparatus for estimating the initial values of parameters of a communication system, such as the initial time alignment and initial frequency offset, that work well in the presence of strong co-channel interference and that are applicable to communication systems that use arrays of antennas.

Another object of the invention is to provide a method (and apparatus) for estimating the initial value of the initial weight vector parameter of a communication system with an antenna array that work well in the presence of strong co-channel interference.

B. Overview of the Invention

The above and other objects of the invention are provided for in a method which operates in a communications system comprising at least one remote terminal and at least one base station, each of the base stations having m antenna elements. The general idea is that at any stage of the parameter estimation process, some of the parameters of the communication system are already determined, while others are to be determined. The already estimated parameters are used together with signals received at the antennas as a result of a transmitted signal which has known properties, in the process of determining the yet to be estimated parameters. Thus there are two sets of parameters, a first set containing estimates of those parameters already determined, and a second set of parameters to be determined. Initially, the first set is empty. At any stage, a next parameter to be determined is selected from the second set, and the received signals and the known properties of the transmitted signal are used, possibly in combination with the parameter estimate(s) in the first set, in estimating the next parameter.

The first preferred embodiment of the method uses the signals received at the antennas when a SYNCH burst comprising a completely known bit sequence is transmitted. That is, the known property is the known bit sequence of the SYNCH burst. The first parameter to be estimated (when the first set is empty) is time alignment. In the next stage, this estimate (which now is the first set of parameters) is used to estimate the other unknown parameters, the frequency offset and initial spatial processing weight vector, again using the known property of the SYNCH burst.

In particular, the method includes transmitting a first signal of known characteristics; receiving the signal as a plurality of m received signals at m corresponding antenna elements, determining a cost function that is related to the at least one or more parameters of the second set, the cost function determining using (i) a copy signal determined from samples of the signals of the first plurality of received signals using a copy weight vector, (ii) if the first set is not empty, estimates of one or more parameters of the first set, and (iii) the known characteristics of the first signal. The estimate of the parameters of the second set are selected as those that minimize the cost function.

An apparatus also is described for determining the parameters, the apparatus part of the communication system. The apparatus includes means for transmitting the signal of known characteristics, which in the preferred embodiment would be included in a remote terminal. Means for determining a cost function that is related to said at least one or more parameters of the second set is included. In the preferred embodiment, The cost function determining means would be in a base station. The determining means includes signal copy means coupled to the receivers of the base station for determining a copy signal from samples of the signals of the first plurality of received signals using a copy weight vector, means for storing any already determined parameters, and means for storing the known characteristics of the first signal. The apparatus also includes calculating means coupled to the cost function determining means for selecting as the estimate of the parameters to be determined the values of those parameters that minimize the cost function.

In particular implementations, the apparatus includes an apparatus for weight matrix, frequency offset and time alignment parameter determination.

IV. DESCRIPTION OF THE PREFERRED EMBODIMENT

A. System Architecture

The various preferred and alternate embodiments of the present invention are for incorporation in a cellular system using the "Personal Handyphone System" (PHS), ARIB Standard, Version 2 (RCR STD-28). In particular, the preferred and alternate embodiments of the present invention are incorporated in combination with the preferred embodiment of Our Demodulation Invention.

The PHS system is an 8 slot time division multiple access (TDMA) system with true time division duplex (TDD). Thus, the 8 timeslots are divided into 4 transmit (TX) timeslots and 4 receive (RX) timeslots. The frequency band of the PHS system used in the preferred embodiment is 1895–1918.1 MHz. Each of the 8 timeslots is 625 microseconds long. The PHS system has a dedicated frequency and timeslot for a control channel on which call initialization takes place. Once a link is established, the call is handed to a service channel for regular communications. Communication occurs in any channel at the rate of 32 kbits per second (kbps), called full rate. PHS also supports half rate (16 kbps) and quarter rate (8 kbps) communications.

In PHS used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec. In order to support half rate and quarter rate communication, the PHS standard defines a PHS frame as four groups, that is, four complete cycles of the eight timeslots. In the embodiments described herein, only full rate communication is supported, so that in this description, the term frame shall be synonymous with the PHS term group. That is, a frame is 4 TX and 4 RX timeslots and is 5 msec long. The details of how to modify the embodiments described herein to incorporate less than full rate communication would be clear to those of ordinary skill in the art.

A logical channel is a conceptual pipe through which messages are exchanged between a remote terminal and the base station. Two types of logical channels exist, logical control channels (LCCH) involved in initializing a communications link, and service channels (SCH) involved in ongoing communications. The preferred embodiments of the present invention applies to communications in the service channels. Here, any particular remote terminal and a base station communicate in bursts in timeslots that are a frame apart.

Frame timing is the start and stop timing of the frames. During call initialization, the remote terminal listens to a control channel called the broadcast control channel (BCCH) of the base station to synchronize itself to the frame timing of the base station. To initialize a call, the base station and the remote terminal communicate on a control channel to establish the timeslot and frequency for the service channel. Once the particular service channel is agreed upon, the base station and remote terminal enter synchronization ("SYNCH") mode over the service channel during which each sends to the other known synchronization bursts ("SYNCH" bursts).

Once the initial alignment and frequency offset is estimated, "normal" mode for communications is entered.

The PHS system uses π/4 differential quaternary (or quadrature) phase shift keying (π/4 DQPSK) modulation for the baseband signal. The baud rate is 192 kbaud. That is, there are 192,000 symbols per second.

Constellation space is the complex constellation swept out by the complex valued (in-phase component I and quadrature component Q) baseband signal. For π/4 DQPSK, the signal constellation space consists of constellation points every 45 degrees around the unit circle starting for convenience at I=1 (normalized) and Q=0, denoted as (1, 0). In practice, the constellation points deviate from the ideal by interference, multipath, and additive noise, slow rotations due to frequency offsets, and by the frequency response and nonlinearities of the radio receivers and transmitters in the system. Differential space is the complex space describing changes in phase from symbol to symbol. That is, it is the complex space swept out by the differential signal which is formed by dividing each constellation space point by the previous constellation space point. For π/4 DQPSK, the differential space signal in theory consists only of the four points with phases +π/4, −π/4, +3π/4, and −3π/4. In practice, actual differential space signals may be distorted due to interference, noise, channel distortion, frequency offset, and time alignment problems.

In the PHS system as used in the preferred embodiment, the RF signal undergoes spectral shaping, typically raised cosine filtering. The resultant baseband signal then only passes through ideal constellation points during brief instants in time during each symbol period. In the preferred embodiment, the baseband signals are sampled at a rate of eight times the baud rate. That is, the sampling rate is 1.536 MHz for eight samples per symbol.

Figure 1:
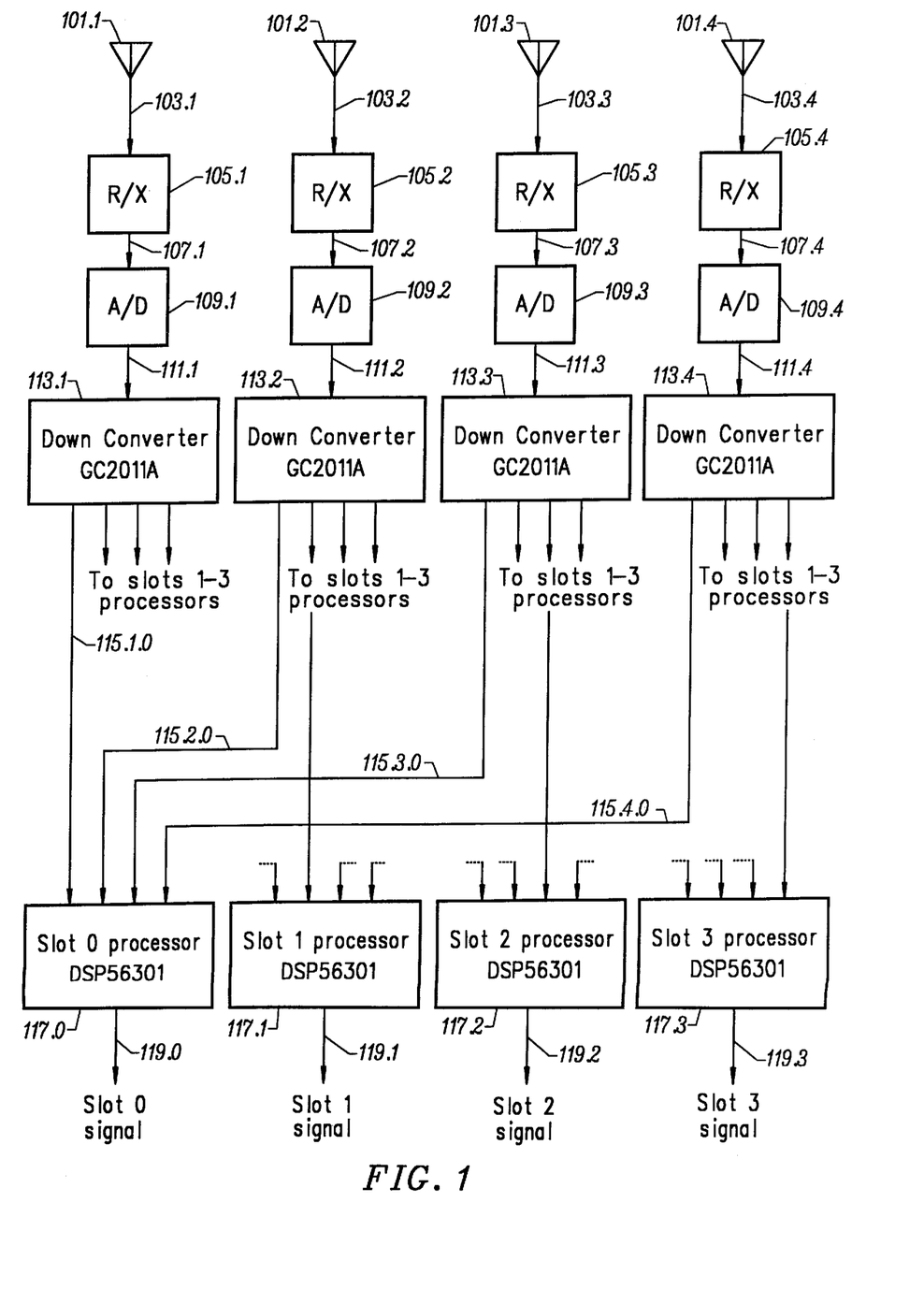
FIG. 1 shows the architecture of the preferred embodiment of the apparatus of the present invention.

The architecture of the preferred embodiment of the apparatus of the present invention is shown in FIG. 1. A plurality of m antennas 101.1, . . . , 101.m is used, where m=4. The outputs of the antennas are mixed down in analog by RX blocks 105.1, . . . , 105.m in three stages from the carrier frequency (around 1.9 GHz) to a final intermediate frequency (IF) of 384 kHz. This signal then is digitized (sampled) by analog to digital converters 109.1, . . . , 109.m at 1.536 MH. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. This is equivalent to multiplying by the complex sequence 1,j, −1, −j, which is easily implemented using sign changing and re-binning. The result is a complex valued signal that contains the complex valued baseband signal plus an image at −2× 384=−768 kHz. This unwanted negative frequency image is filtered digitally to produce the complex valued baseband signal sampled at 1.536 MHz. In the preferred embodiment, GrayChip Inc. GC2011A digital filter devices 113.1, . . . , 113.m are used, one for each antenna output, to implement the down-converting and the digital filtering, the latter using finite impulse response (FIR) filtering techniques. Determining the appropriate FIR filter coefficients is done using standard techniques as would be clear to a person of ordinary skill in the art.

There are four downconverted outputs from each antenna's GC2011A digital filter device 113, one per time slot. For each of the four timeslots, the four downconverted outputs from the four antennas are fed to a digital signal processor (DSP) device 117 for further processing as according to this invention. In the preferred embodiment, four Motorola DSP56301 DSPs are used, one per receive timeslot.

The following notation is used herein.

Let $z_1(t), z_2(t), \ldots, z_m(t)$ be the complex valued responses of the first, second, . . . , m'th antenna elements, respectively, after down-conversion, that is, in baseband. These can be represented by an m-vector z(t) with the i'th row of z(t) being $z_i(t)$. Consider N digital samples of z(t) denoted by z(T), z(2T), . . . , z(NT), where T is the sampling period. For simplicity and convenience, the sampling period will be normalized to 1 and z(t) (and other signals) will denote either the function of continuous time t or the sampled signal, which case being clear from the context to one of ordinary skill in the art. The N samples of z(t) can be expressed as a matrix Z=[z(1)|z(2)| . . . |z(N)]. Suppose that complex valued co-channel signals $s_1(t), s_2(t), \ldots, s_p(t)$ from p distinct sources (remote terminals) are sent to the antenna array. In that case, the $z_i(t)$, i=1, . . . , m at the m antenna array elements are each some combination of these p signals, together with noise and other interference. The particular combination depends on the geometry and propagation. Let the co-channel signals be represented by p-vector s(t) whose k'th element is complex valued signal $s_k(t)$.

The signal $s_k(t)$ can be modeled as $$s_k(t) = \Sigma_n b_k(n) g(t - n T_s),$$

where the summation $\Sigma_n$ is over index n for all values of n in a data batch or burst, $\{b_k(n)\}$ is the symbol sequence sent by the k'th remote terminal, $T_s$ is the symbol period, and g(t) represents the impulse response combining the effects of any transmit filter(s), the propagation channel, and any receive filter(s) used. Typically, g(t) is of duration greater than $T_s$. g(t) is made unit-energy for convenience. In the preferred embodiment, the symbol period $T_s$ is taken to be an integer multiple L of the sample period T, where L=8. Since T is normalized to 1, $T_s$=L=8. The complex valued symbols $b_k(n)$ belong to some finite alphabet Ω. For the π/4 DQPSK modulation of the PHS embodiment, Ω={1, exp±jπ/4, exp±jπ/2, exp jπ, exp±j3π/4}, and for any k or n, the differential signal $d_k(n) = b_k(n)/b_k(n-1)$ belongs to finite alphabet {±π/4, ±3π/4}.

Denoting matrix S as having columns corresponding the same N samples of s(t) as in Z, the aim of demultiplexing is to produce some estimate of S. A linear estimate is taken. That is $$\hat{S} = W_r^H Z$$

where $W_r$ is a m×p matrix called the weight matrix and $W_r^H$ is the complex conjugate transpose, that is, the Hermitian transpose of $W_r$. The r subscript in $W_r$ refers to "receiver" to indicate we are dealing with reception rather than transmission. The k'th column of $W_r$, m-vector $w_{rk}$, is called the weight vector for the k'th signal $s_k(t)$. Thus the estimate of $s_k(t)$ is $$\hat{s}_k(t) = w_{rk}^H z(t).$$

Our Demodulating Invention describes how to demodulate the signal sent from such one particular remote terminal k in the presence of the other signals from remote terminals j, j≠k, that is, in the presence of co-channel interferers. For convenience, the notation shall be simplified so that the subscript k shall be implicit. It would be clear to one in the art that the operations for this one signal would be repeated for signals from the other (p−1) signals using the complete operation shown in the matrix equation above.

By a signal copy operation we mean the operation $$\hat{s}(t) = w_r^H z(t).$$

to estimate particular samples of a particular signal from samples (in t) of the m received signals z(t) using the weight vector $w_r$.

A reference signal is a signal that has the required modulation structure. That is, a signal of the structure $$s_R(t) = \Sigma_n b(n) g(t + \epsilon - n T_s)$$

where $\epsilon$ is the timing error. In the case of the preferred embodiment, $s_R(t)$ is a $\pi/4$ DQPSK waveform.

B. General Method

The general idea is that at any stage of the parameter estimation process, some of the parameters are already determined, while others are to be determined. The already estimated parameters are used together with signals received at an antenna as a result of a transmitted signal which has known properties, in the process of determining the yet to be estimated parameters. Thus there are two sets of parameters, a first set containing estimates of those parameters already determined, and a second set of parameters to be determined. Initially, the first set is empty. At any stage, a next parameter to be determined is selected from the second set, and the received signals and the known properties of the transmitted signal are used, possibly in combination with the parameter estimate(s) in the first set, in estimating the next parameter.

The first preferred embodiment of the method and apparatus of this invention uses the signals received when a SYNCH burst comprising a completely known bit sequence is transmitted. That is, the known property is the known bit sequence of the SYNCH burst. The first parameter to be estimated (when the first set is empty) is time alignment. In the next stage, this estimate (which now is the first set of parameters) is used to estimate the other unknown parameters, the frequency offset and initial spatial processing weight vector, again using the known property of the SYNCH burst. In the preferred embodiment of Our Demodulation Invention, these estimates are used as initial estimates of the time alignment, frequency offset, and spatial processing weight vector parameters, respectively, and once the initial estimates of these parameters is determined, "normal" mode for communications is entered.

During normal mode, the method and apparatus of Our Demodulation Invention uses an array of antennas, and demodulates and determines $w_r$ on an ongoing basis using an improvement of the known alternating projections method. If one considers the set of spatial processing weights as a complex valued vector $w_r$, the alternating projections method can be described as: starting with an estimate for $w_r$, project this into reference signal space to get a better estimate of the reference signal, and project the better estimate of the reference signal into $w_r$-space to get a better estimate of $w_r$, and iterates back and forth between $w_r$-space and reference signal-space until one obtains a "very good" $w_r$ that produces a "very good" estimate of the reference signal. In Our Demodulation Invention, ongoing estimates of the frequency offset and time alignment parameters are used to assure that the $w_r$ and the symbols which are part of the reference signal are corrected for this offset and alignment. The second preferred embodimentof the present invention is used to provide these ongoing estimates of the frequency offset and time alignment parameters.

C. First Preferred Embodiment

Figure 2:
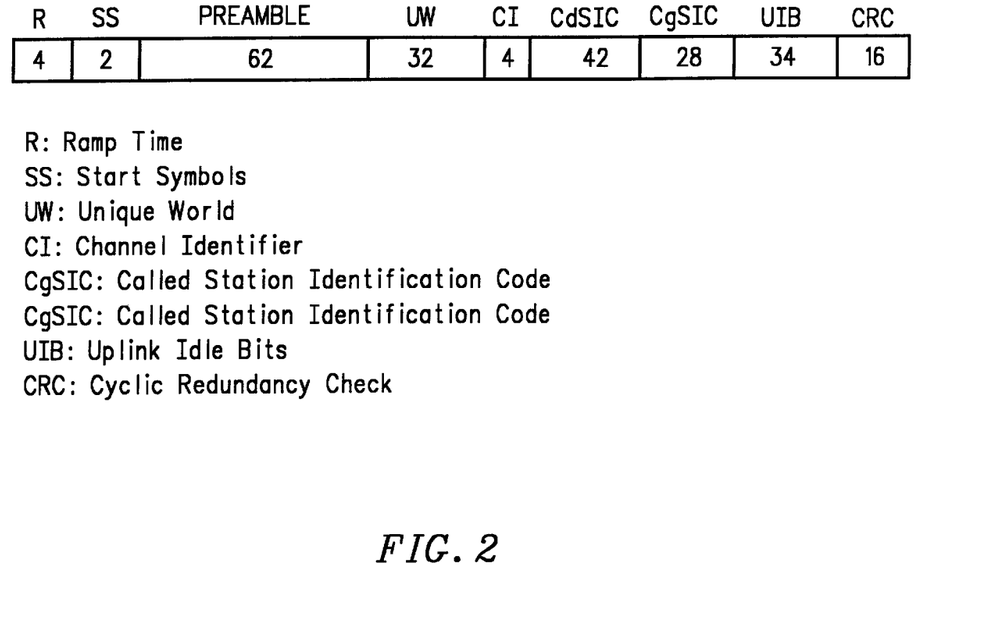
FIG. 2 shows a diagram of the burst used to perform synchronization in the preferred embodiment of the invention.

The first preferred embodiment of the present invention uses a burst, the SYNCH burst, in which the known property is a known format, in order to estimate the time alignment, frequency offset, and initial weight vector $w_r$ parameters. FIG. 2 is a diagram of the burst used to perform synchronization. Note that the SYNCH burst has several fields, and one is free to use all or any of the fields of the burst or part of a field. The first field is called the preamble and is a particular periodic bit sequence. The Fourier transform (estimated using an FFT calculation) of this particular field reveals that there are three strong sinusoidal components, and one alternative embodiment of the method uses this fact.

The preferred embodiment determines a cost function, in particular the quadratic cost function (the squared error), and uses an optimization method, in particular least squares optimization, to determine the parameter value that minimizes the cost function. Other cost functions and optimization methods may be used without deviating from the scope of this invention. The first parameter thus determined is the time alignment, a time shift (expressed as a number of samples) that gives the minimum cost function. Once the time alignment is estimated, it is used in determining a cost function which is related to the initial $w_r$ and frequency offset, and an optimization method is used to determine the initial $w_r$ and frequency offset estimates.

The position in time is approximately known. In the first preferred embodiment, it is assumed that initially the position in time of the burst is known to within ±2 symbols (±16 samples), and alignment is estimating the position of the burst within this window of 32 samples. A single SYNCH is used for alignment, first to estimate the rough position and then to estimate the more accurate position in time. Once alignment is determined, the same SYNCH burst is used to estimate the frequency offset and the initial weight vector $w_r$. In an alternate embodiment, when a slower processor is used for the estimation, so that time of calculation is more critical, three bursts are used in total. Two bursts are used for alignment, the first to estimate the rough position and the second to estimate the more accurate position in time. Once alignment is determined, in the third embodiment with a slower processor, a third SYNCH burst is used to estimate the frequency offset and the initial weight vector $w_r$.

Figure 3:
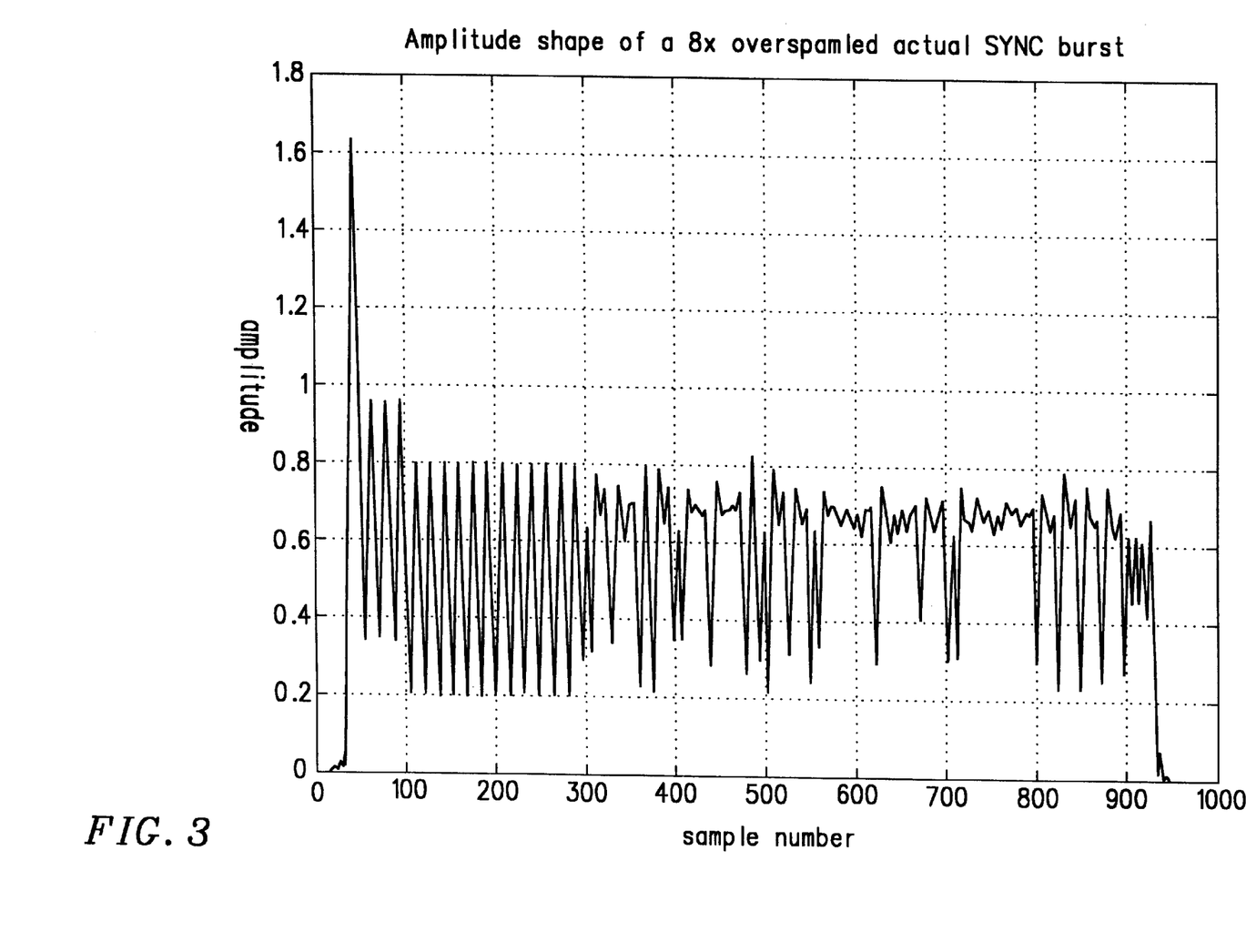
FIG. 3 shows the amplitude (magnitude) of a SYNCH burst used in the preferred embodiment of the invention.

Time alignment estimation is now described in more detail. Only amplitude, not complex valued data, is used for this. FIG. 3 shows the amplitude (magnitude) of a SYNCH burst. As would be expected, it was observed looking at several such SYNCH bursts having different frequency offsets that this amplitude signal (amplitude vs. time) does not vary significantly between SYNCH signal bursts with different frequency offsets. Although in a broad sense, the known property used in this embodiment is the known bit sequence of the SYNCH burst, in a narrower sense, it is a known property that the amplitude signal does not vary significantly with frequency offset that is exploited in determining the time alignment in the particular implementation. Other variations of the method would be clear to one in the art for cases when the magnitude characteristics do change with frequency offset.

Figure 4A:
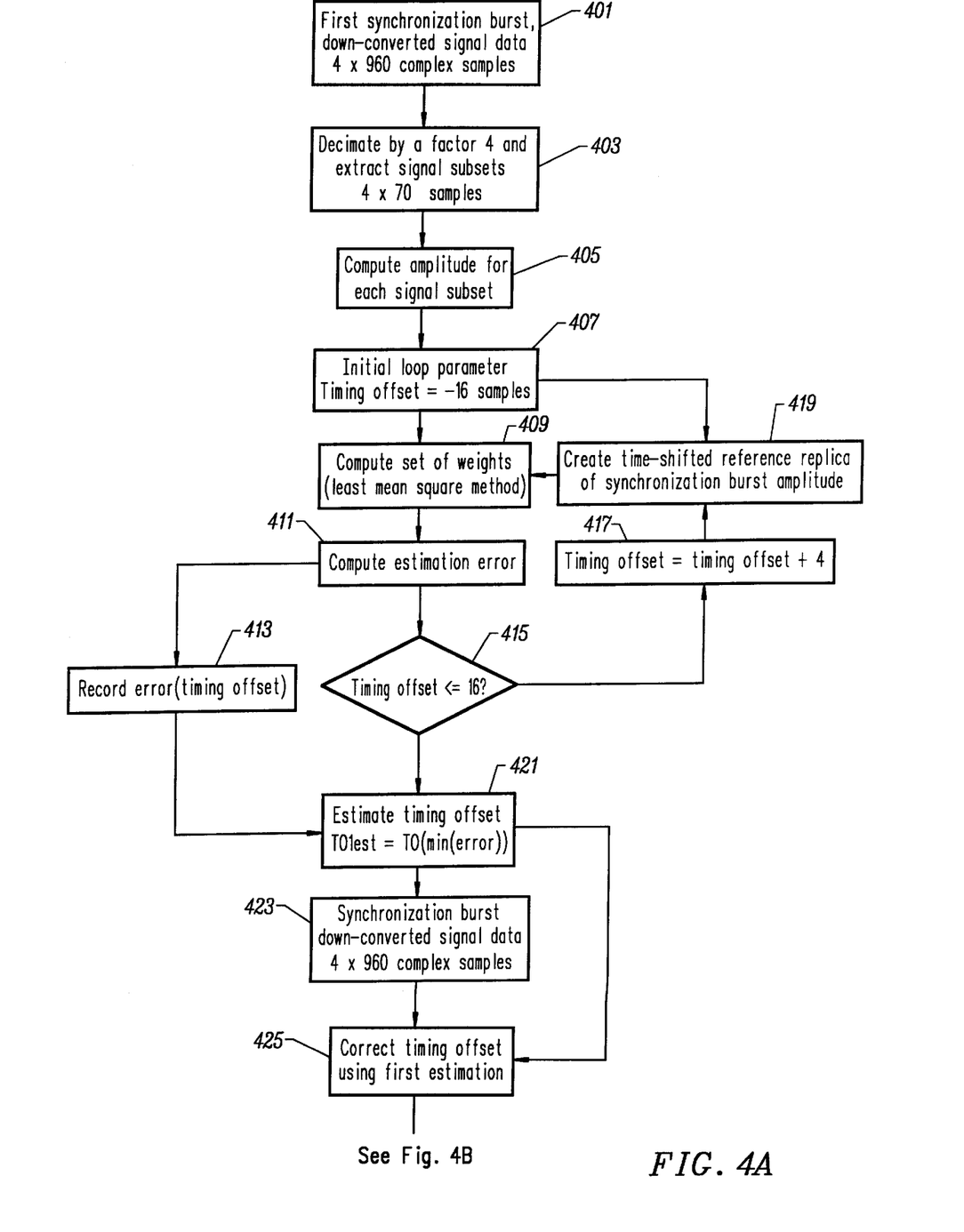
FIG. 4 shows a flow chart of the alignment method according to the preferred embodiment of the invention.
Figure 4B:
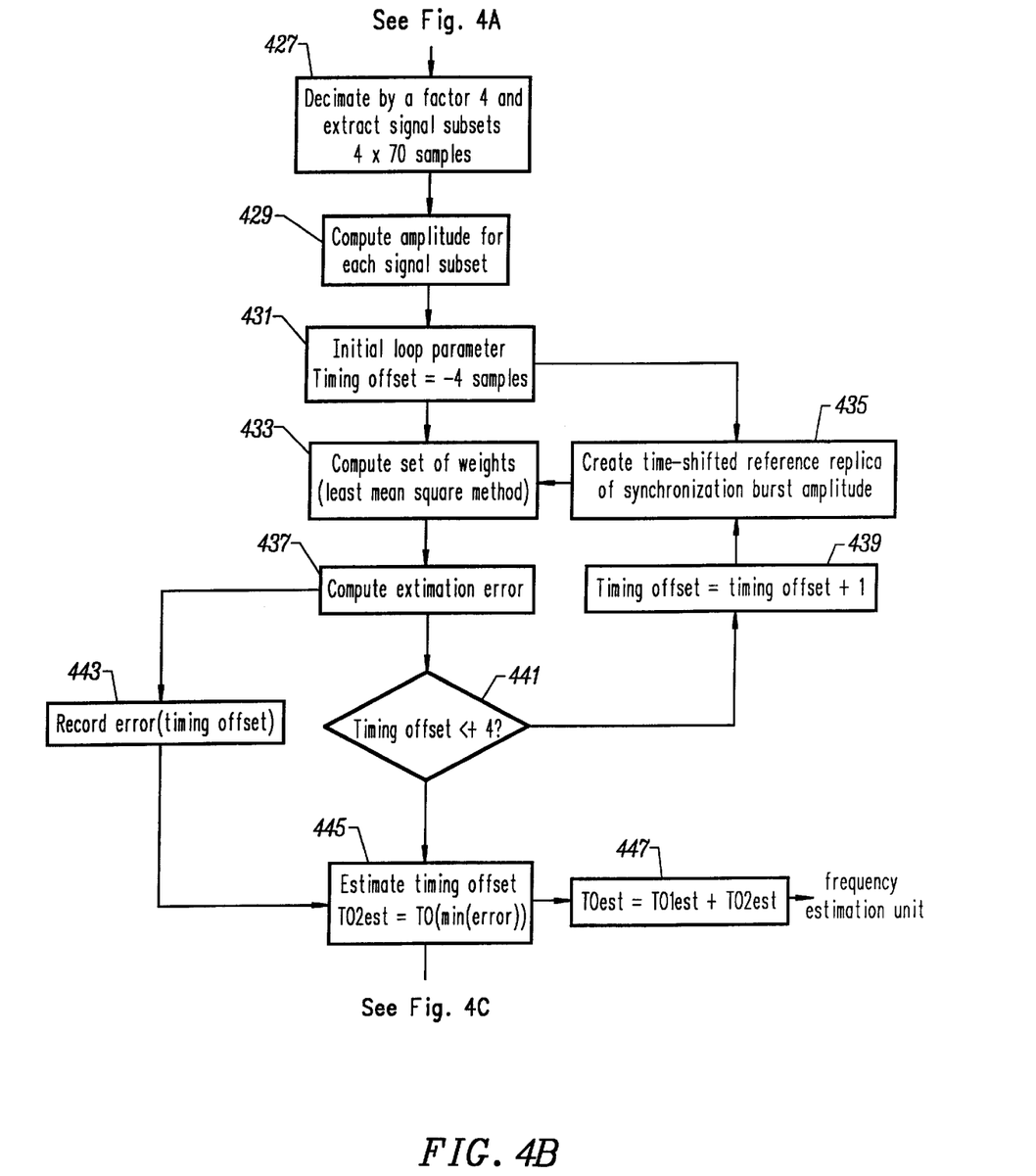
Figure 4C:
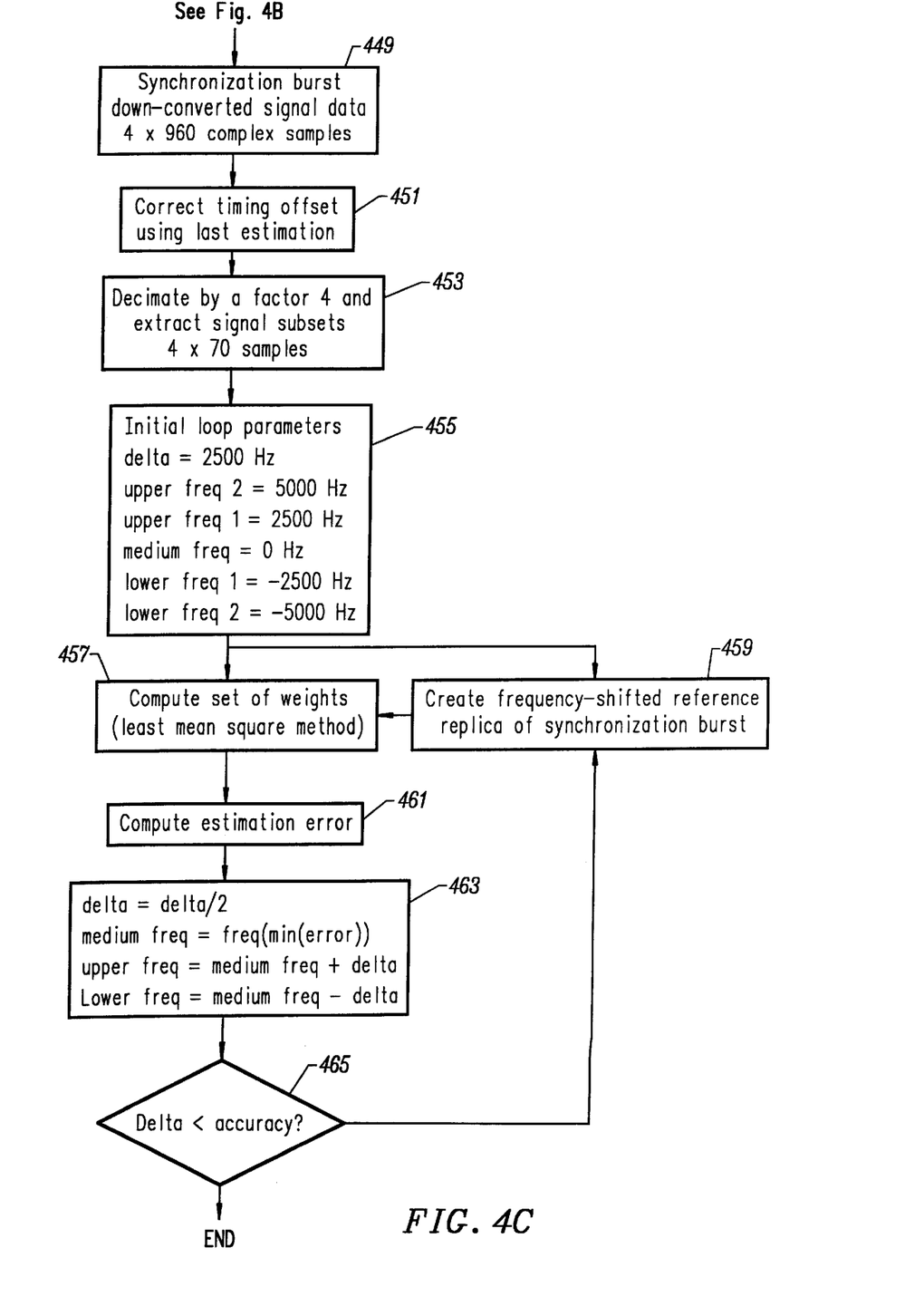

FIG. 4 shows a flow chart of the method according to the first preferred embodiment. The method starts at step 401 with a downconverted burst of m signals $z_1(t), \ldots, z_m(t)$, where m=4.960 complex valued samples are taken at each antenna. Since the signal is oversampled at 8 times the baud rate, it is decimated by a factor of 4 in step 403 down to the frequency of two samples per symbol.

Only a part of the burst is used in the method. In the preferred embodiment, referring to the amplitude of a typical burst shown in FIG. 3, a single area starting around the middle of the PREAMBLE field (sample numbers 6–67) in the SYNCH burst is used to make a subset of the burst. In the flowchart of FIG. 4, Step 405 is the taking of the subset. Other variations of the subset structure include using any numbers of areas, or, indeed, the entire burst as the subset.

A loop to determine the weight vector and alignment is now commenced in step 407 in which it is assumed that the time offset is within. The weight vector in this loop is computed for the purpose of determining the time offset within the window in step 409. There are four copies of the incoming signal (and subsets), one for each antenna. Denote these subsets of signals by complex valued row vectors, each row vector being of the time samples of the subset for the particular antenna. Let m×N matrix $|Z|^2$ represent the amplitude squared of the time samples corresponding to the respective subsets of the signals at the m antennas. That is, define $|z|^2(t)$ as the m-vector whose i'th element is $|z_i(t)|^2$, the squared magnitude of the signal subset at the i'th antenna at time sample t, where t is over the subset being considered. Then define $$|Z|^2=[|z|^2(1)|z|^2(2) \ldots |z|^2(N)].$$

Figure 5:
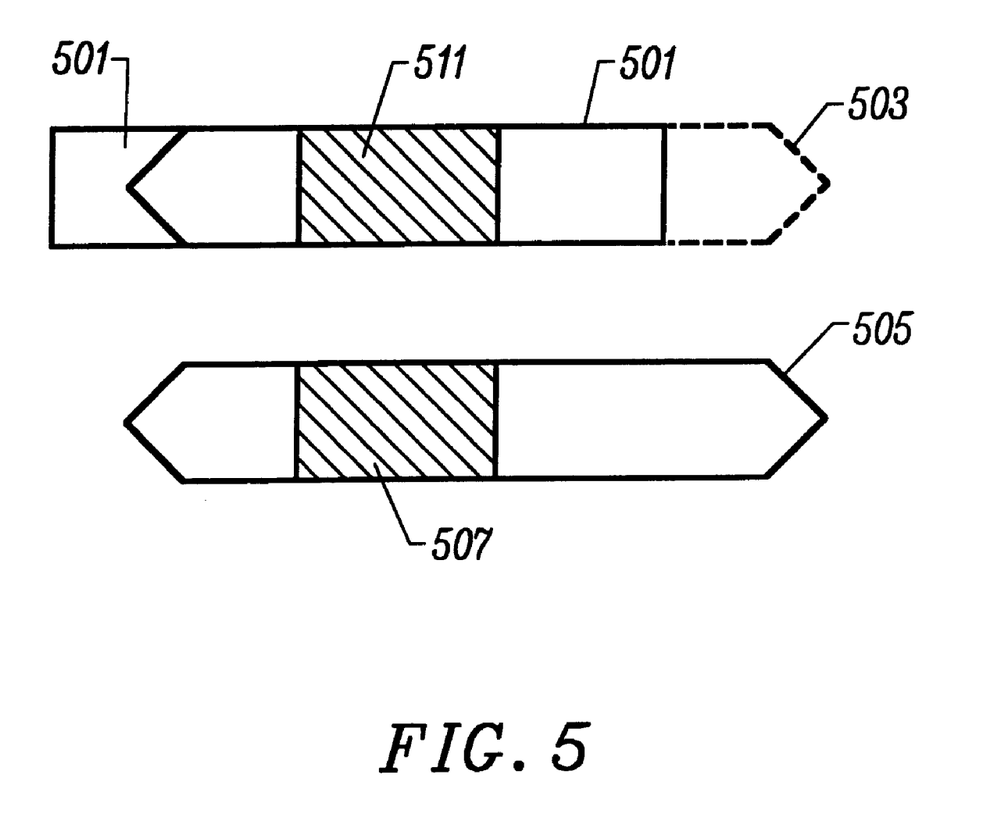
FIG. 5 shows the alignment window and the subset of the SYNCH burst considered in the preferred embodiment of the initial alignment and frequency offset estimator.

One considers a linear combination of these $|z_i(t)|^2$s with real valued weights $w_1, w_2, \ldots, w_m$, and forms a cost function which compares this linear combination to the known magnitude squared of same subset in the known SYNCH burst. FIG. 5 illustrates the subset made up of area 511 for the SYNCH burst 503 within the window 501, and the subset of the corresponding area 507 for the reference SYNCH burst 505. The reference SYNCH burst, a signal, is kept in read only memory (ROM). Denote the magnitude squared of the reference SYNCH burst in subset 507 by $|s_r|^2(t)$ and let row vector $|s_r|^2$ be the samples of the magnitude squared of the reference burst 505 in area 507. That is $$|s_r|^2=[|s_r(1)|^2|S_r(2)|^2 \ldots |S_r(N)|^2].$$

Define column m-vector $w_r$ as having real valued weights $w_1, w_2, \ldots, w_m$ as its elements. Define the signal copy operation on $|z|^2(t)$ as determining the copy signal $w_r^T|z|^2(t)$. Then the optimization in step 409 is to find that $w_r$ that brings the copy signal $w_r^T|z|^2(t)$ as close as possible (in some norm) to the known $|s_r|^2(t)$. In the preferred embodiment, the cost function $$J=|||s_r|^2-w_r^T|Z|^2||^2$$

is minimized. Optimization techniques for finding the $w_r$ that minimizes such J are well known in the art. See for example, G. H. Golub and C. F. Van Loan, *Matrix Computations*, 2nd ed., Baltimore: John Hopkins University Press, 1989, B. N. Datta, *Numerical Linear Algebra and Applications*, Pacific Grove, Calif.: Brooks/Cole, 1995 (Section 6.10), or W. H. Press, et al., *Numerical Recipes in C*, 2nd ed., Cambridge, UK: Cambridge University Press, 1992 (Chapter 10).

The literature on such methods solves matrix optimization problems with cost functions of the form $J=(b-Ax)^H(b-Ax)$. To translate to the present case, one makes the substitutions $b^T=|s_r|^2$, $A^T=|z|^2$, and $x^T=w_r$. Note that the notation b (and A and x) used here for "generic" vectors have no relationship to the symbols $b_k(n), b(n), b_0(n)$, etc., used elsewhere herein.

Two alternate methods are used in two different implementations for solving the optimization problem. The first is the conjugate gradient method. This minimizes $f(x)=\frac{1}{2}x^HAx-x^Hb$. The function has a minimum value of $-\frac{1}{2}b^H\text{inv}(A)b$ for $x=\text{inv}(A)b$, where $\text{inv}(A)$ is the pseudoinverse of A. The minimization is carried out by generating a set of search directions $p_k$. At each stage, denoted by index k, a quantity $a_k$ is found that minimizes $f(x+a_kp_k)$ and $x_{k+1}$ is set equal to $x_k+a_kp_k$. The vector $p_k$ is chosen such that the function $f(.)$ is minimized over the entire vector space spanned by $\{p_1, p_2, \ldots, p_k\}$.

The following is the procedure used for finding the pseudoinverse using conjugate gradients.

```
x = 0;
S_k = b;
for k = 1:4
    r_k = s_kA^H;
    if (k = 1)
        p_k = r_k;
        l_r = r_k(:)^H r_k(:);
    else
        r_kOldLen2 = l_r;
        l_r = r_k(:)^H r_k(:);
        b_k = l_r/r_kOldLen2;
        p_k = r_k + p_kb_k;
    end
    q_k = p_kA;
    a_k = l_r/q_k(:)^H q_k(:);
    x = x + a_kp_k;
    s_k = s_k - a_kq_k;
end
```

The second method used for finding the pseudoinverse is by formally calculating the pseudoinverse which minimizes the L2 norm of the system of equations Ax–b, that is, which minimizes $$J=(b-AX)^H(b-Ax).$$

The value of x that minimizes the J is $(A^HA)^{-1}A^Hb$ and the minimum value of J is $b^Hb-b^H(P-I)b$, where $P=A(A^HA)^{-1}A^H$ is called the projection matrix of A and $(A^HA)^{-1}A^H$ is the pseudoinverse of A.

The advantage of this technique over conjugate gradient method is when this optimization is needed to be computed several times for different values of b ($s_{ref}$ in the case of this invention), the computation of the pseudoinverse $(A^HA)^{-1}A^H$ of A does not depend on b, and thus need only be carried out once for any A, which, in the case of the present invention, means once for any received signal z. In the case of using conjugate gradients, each minimization requires the same computation involving both A and b.

In the preferred embodiment, adaptive normalization is used at each step of the computation. For this, a normalized error term (normalized by $b^Hb$) is used. This normalized cost function, denoted by J' is $$J'=J/b^Hb=1-b^H(P-I)b/b^Hb,$$

so that minimizing J' is equivalent to maximizing $b^H(P-I)b/b^Hb$. For numerical and stability reasons, determining the pseudoinverse is implemented in the preferred embodiments of the present invention to within a scale factor. P and hence (P–I) are invariant to such a scale factor. In order to avoid having to calculate such a scale factor, in the preferred embodiments, whenever J needs to be calculated for comparison reasons, values of J' are instead determined and compared. See, for example, steps 411 and 421 below.

As a result of such scale factors used in calculating the pseudoinverse, the vector x and hence the weight vector is determined to this scale factor. To avoid having to explicitly calculate this scale factor, all reference signals, in this case $|s_r|$, are defined for this scale factor. The particular application of this invention is for weight vectors that are determined for use in signal copy operations and to determine and compare reference signals, all reference signals and signal copy operations are normalized to this scale factor for consistent results.

Returning to the flow chart, once the weights are computed, the estimation squared error in the form of J' is computed in step 411. This error is stored in step 413 together with the timing offset for this $w_r$. Also, in step 415 a check is made to determine if the error has been calculated for all offsets of this loop, which, because of the decimation, is every four samples. If not, in step 417, the decimation factor 4 is added to the offset being determined. That is, window 507 is shifted by 4, and in step 419 and 409, a new set of weights is again determined. In step 411, the new error for this new offset is determined. In this way 9 trials in total are repeated. Thus one ends up with the error as a function of the 9 offsets, these offsets separated by 4 samples. In step 421, the offset $w_r$ that gives minimum squared error J' is selected to give a coarse offset estimate.

The method now moves to the second loop which determines the alignment estimate within the four samples of the coarse estimate. In the preferred embodiment, the same SYNCH burst is used (step 423). In alternate implementations, a second SYNCH burst may be used in order to limit the computational power needed.

The coarse alignment determined is used in step 425 to correct the data received at the antennas during the SYNCH burst period. The received data in step 427 is again decimated and a subset is determined corresponding to area 511. Now a loop is started again which is similar to the coarse alignment determining loop described above, except that rather than considering every four samples for coarse alignment selection, one now looks within the 4 samples determining a fine alignment. The final alignment is determined in step 447 by adding the coarse alignment and the fine alignment estimates.

At this stage, one parameter, alignment has been estimated, and becomes the first set. This now is used to estimate the parameters of the second set: the frequency offset and weight vector parameters. Again, the same SYNCH burst is used. In alternate embodiments in which the computational power available might be limited, an additional SYNCH burst may be used to estimate the frequency offset and the weight vector $w_r$.

In determining alignment, $|z_i(t)|^2$, $i=1,\ldots,m$, the squared magnitudes of the subset of signals at the antennas were used, and $w_r$ had real valued components. For frequency offset estimation and $w_r$ determination, the full complex valued data $z_i(t)$, $i=1,\ldots,m$, of the subset of antenna signals is used, and $w_r$ is complex valued. The burst is received in step 449, and corrected for alignment timing offset in step 451 using the alignment estimate determined in step 447. The signal is decimated by a factor of 4 and the subset is extracted in step 453. The main estimation loop is now started. Five values for frequency offset are used initially in the loop. The difference between each of the 5 points is called delta, and initially set to 2048 Hz. The five points are −4096 Hz, −2048 Hz, 0, +2048 Hz and −4096 Hz. Different implementations may use different values. The main loop is almost identical to above for time alignment estimation, except that the frequency shift that gives us the minimum squared error is computed. Define $z(t)=[z_1(t)z_2(t)\ldots z_m(t)]^T$ and $$Z=[z(1)z(2)\ldots z(N)].$$

One considers a linear combination of these $z_i(t)$'s with complex valued weights $w_1, w_2, \ldots, w_m$. Denote the reference SYNCH burst in subset 507 after frequency offset correction by $s_r(t)$ and let row vector $s_r$ be the samples of the magnitude of the reference burst 505 in area 507 corrected by the frequency offset. That is $$s_r=[s_r(1)s_r(2)\ldots s_r(N)].$$

The frequency shift is applied by multiplying each complex valued sample by a phase shift corresponding to the frequency offset. Define complex column m-vector $w_r= [w_1 w_2 \ldots w_m]$. Then the optimization in step 457 is to find that $w_r$ that brings the copy signal $w_r^H z(t)$ as close as possible (in some norm) to the known and frequency offset corrected $s_r(t)$. In the preferred embodiment, the cost function $$J=\|s_r - w_r^H Z\|^2$$

is minimized. In this way, the weights $w_r$ that minimize this cost function for each of the 5 frequency offsets are determined. As before, when the pseudoinverse method is used, weights $w_r$ are determined to within a constant. It will be clear to those in the art that in that case, $s_r(t)$ also will be defined with that scaling in mind for consistency. The squared estimation error (normalized as J') for each of these weight vectors $w_r$ is determined in step 461, and then the frequency offset that gave the minimum error is selected. Call this Coarse_Offset_Freq. A binary search is now carried out for three values centered around and including Coarse_Offset_Freq that gave minimum error in the last recursion with a delta of 1024 Hertz. That is, the weights and errors are determined for (Coarse_Offset_Freq−delta) and (Coarse_Offset_Freq+delta), the two additional frequency offset values around the Coarse_Offset_Freq, and, using a binary search, the frequency offset that gives minimum squared error is selected from the set {(Coarse_Offset_Freq−delta), Coarse_Offset_Freq, (Coarse_Offset_Freq+delta)}. Delta is now halved, and a new binary search is commenced. This binary search loop of halving delta is continued until delta is less than is the required accuracy for the frequency offset. In the preferred embodiment this is 16 Hz.

Two alternate methods also can be used in determining the frequency offset. These techniques, the gradient technique and interpolation, may be computationally more efficient. In the gradient technique, one exploits the observation that the error function curve versus frequency offset is smooth and typically presents two and sometimes three minima. Hence finding the main minimum is very easy using the well known gradient minimization techniques, and requires only a few iterations. The same main estimation loop as used in the binary search method is used to approximate the minimum before starting the gradient search loop. The interpolation method uses a fourth order polynomial. One determines the frequency offset by determining the polynomial that "best" fits, in a least square sense, the error function curve in the neighborhood of its main minimum. This method involves two loops. The first one determines the approximate minimum. For this, five error points are computed, corresponding to −4,000 Hz, −2,000 Hz, 0 Hz, 2,000 Hz and 4,000 Hz, and the approximate estimate is taken to be the offset giving minimum error. In the second loop, four refined error values around the approximate estimate are determined as the approximate estimate ±1500 Hz and the approximate estimate ±750 Hz. These four values together with the approximate estimate are used to fit a fourth order polynomial. The derivative and the three roots to the polynomial are then determined. The estimate of the frequency offset parameter is the non-complex root that is the closest to the approximate estimate.

Thus the frequency offset and weight vector parameters, that is, the second set parameters are determined. Thus, in a single SYNCH burst, all three parameters are estimated: the alignment, frequency offset and weight vector $w_r$. As previously mentioned, if there is not sufficient computational power, in alternate embodiments, these parameters may be determined in two or three SYNCH bursts.

D. Second Preferred Embodiment

The second preferred embodiment uses as the known characteristic of the transmitted signal, the known finite alphabet properties of the signal transmitted during normal-mode to determine estimates of the frequency offset and time alignment parameters. Parameters thus estimated are used for ongoing frequency offset and alignment correction as part of Our Demodulation Invention.

In the second preferred embodiment, one again starts with the first set of parameters, those not yet estimated, being the empty set the second set of parameters, those to be estimated, consists of the frequency offset and time alignment parameters. The time alignment parameter is first estimated.

An initial value of $w_r$, denoted herein as $w_{r_0}$, is assumed. Any method may be used for determining $w_{r_0}$. In the preferred embodiment of Our Demodulation Invention, the first preferred embodiment of the present invention is used to determine this $w_{r_0}$. As before, let z(t) be the downconverted received signal vector. One first produces a estimate of the signal of interest by a simple copy signal operation using this $w_{r_0}$ together with z(t) to produce an estimate of the signal expressed as $$\hat{s}_0(t) = W_{r_0}^H Z(t)$$

Note that $\hat{s}_0(t)$ is oversampled by a factor L (L=8 in the preferred embodiment). Let complex valued sequence $\{b_0(n)\}$ be the complex values of $\hat{s}_0(t)$ at the equally spaced sample points. Note the difference in sampling period between this sequence and $\{b_k(n)\}$, the symbol sequence sent by the k'th remote terminal. The $b_k(n)$ are the symbol points and occur every L samples, while the $b_0(n)$ are the complex values of $\hat{s}_0(t)$ at the equally spaced sample points. Consider the phase difference signal between subsequent samples. Denote the differential stream formed by dividing $b_0(n)$ by the sample at the presumed previous constellation point $b_0(n-L)$ as $d_0(n)$. $\{d_0(n)\}$ is a signal sequence whose phase is the phase shift from one signal sample to the signal one baud symbol (L samples) away. That is, $$d_0(n) = b_0(n)/b_0(n-L) \rightarrow \angle d_0(n) = \angle b_0(n) - \angle b_0(n-L)$$

where $\angle$ is the phase. In prior-art $\pi/4$ DQPSK demodulation, the quadrant of complex valued $d_0(n)$ at the ideal differential constellation points is the demodulation decision. Denote the four quadrants of the complex plane as $\Phi_1, \Phi_2, \Phi_3$, and $\Phi_4$ for the first, second, third, and fourth quadrants, respectively. That the quadrant is sufficient for demodulation is the main consequence of the finite alphabet property of the $\pi/4$ DQPSK signals, and is in the ideal case, at an ideal differential constellation point, $\Phi d_0(n) = \pm \pi/4$ or $\pm 3\pi/4$. This finite alphabet property of the signal is now exploited. An ideal differential signal $d_{0ideal}(n)$ is defined as is $d_0(n)$ relaxed to the nearest ideal differential constellation point. That is, $$d_0(n) \in \Phi_i \rightarrow \angle d_{0ideal}(n) = (2i-1)\pi/4,$$

i=1, 2, 3, or 4. Denote by "fa" (for finite alphabet) the relationship between $d_0(n)$ and $d_{0ideal}(n)$. That is, $d_{0ideal}(n) = fa\{d_0(n)\}$. Define alignment squared error as $e_A^2(n) = |d_0(n) - d_{0ideal}(n)|^2$ as the square of the distance (in the complex plane) between a differential point and its closest ideal differential constellation point. At a sample point that is not near a symbol point, the error distance may be relatively large.

In the embodiment of the invention, one does not explicitly determine the $\{d_0(n)\}$, but rather uses the fact that angle of each $d_0(n)$, $\angle d_0(n) = \angle [b_0(n)b_0^*(n-L)]$.

Let $[b_0(n)b_0^*(n-L)] = x_{Re}(n) + jx_{Im}(n)$ on the complex plane ($j^2 = -1$). Then the signal $|x_{Re}(n)| + j|x_{Im}(n)| \in \Phi_1$, the first quadrant, in which case $d_{0ideal}(n)$, when normalized, would be $1/\sqrt{2} + j1/\sqrt{2}$. The measure of alignment squared error $e_A^2(n)$ used in the preferred embodiment is $$e_A^2(n) = (|x_{Re}(n)| - 1/\sqrt{2})^2 + (|jx_{Im}(n)| - 1/\sqrt{2})^2.$$

This avoids having to demodulate the signal. One now forms a cost function corresponding to and related to the time alignment parameter. In this embodiment, this cost function is $$J_x = \sum_{j=1}^{N/L} e_A^2(x + jL), \quad x = 0, \ldots, (L-1),$$

which is a summation of all the error distances for all the samples in a burst as a function of alignment x. The first preferred embodiment of the method of the present invention is to select the point that has the minimum $J_x$ as the alignment point $x_{min}$. Other cost functions, such as mean absolute error, may alternatively be used.

Note that in this embodiment, $x_{min}$ is the alignment within the L sample points around a baud point, whereas in first embodiment using a SYNCH burst, the overall alignment is determined. The overall alignment is readily determined from $x_{min}$ by looking at framing bits using standard techniques well known in the art.

Thus once $x_{min}$ has been determined, the first set becomes the alignment parameter, and one proceeds to estimate the frequency offset parameter using the alignment parameter estimate $x_{min}$ to align the data. Denote by $d'_0(n)$ and $d'_{0ideal}(n)$, respectively, the differential points $d_0(n)$ and $d_{0ideal}(n)$, respectively, after alignment by $x_{min}$. That is, $d'_c(n) = d_c(n + x_{min})$ and $d'_{Cideal}(n) = d_{Cideal}(n + x_{min})$. As before, and, as will be described below, the actual implementation does not involve explicitly determining d'(n) and $d'_{0ideal}(n)$. Denote the phase error as $$e_P(n) = \angle d'_0(n) - \angle d'_{0ideal}(n)$$

Define a cost function as the average of the phase error $e_P(n)$ over the samples. The method of the present invention determines this without explicitly requiring demodulation.

Define $b'_0(n)$ as the aligned version of $b_0(n)$. The first step is to determine $[b'_0(n)b'_0^*(n-L)]$. Now determine $\Phi_i$, the quadrant $[b'_0(n)b'_0^*(n-L)]$ lies in. Next, depending on which quadrant $[b'_0(n)b'_0^*(n-L)]$ lies in, rotate $[b'_0(n)b'_0^*(n-L)]$ by $-\pi/4$, $-3\pi/4$, $3\pi/4$ or $\pi/4$, for $\Phi_i = 1$, 2 3 or 4, respectively. This moves $\angle [b'_0(n)b'_0^*(n-L)]$ to be in the range of between $-\pi/4$ and $\pi/4$. Denote this rotated $[b'_0(n)b'_0^*(n-L)]$ by $P'(n) = P_{Re}'(n) + jP_{Im}'(n)$ in the complex plane.

The method for computing $e_P(n)$ uses the fact that multiplying phasors adds the phase angles. To determine total phase one needs to separate out the positive phase contributions and the negative phase contributions. For each of these, one multiplies the phasors, taking note via a counter how many multiples of $2\pi$ there are since otherwise the result would be modulo $2\pi$. The final total phase is then the total positive phase contributions minus the total negative phase contributions. The pseudocode for this is as follows:

a_pos=1;
a_neg=1;
c_pos=0;
c_neg=0;
for n=1, . . . , N/L if $P_{Im}'(n) > 0$
　　$a''_{13}$ pos=a__pos;
　　a__pos *=P'(n);
　　if $((Re\{a''\_pos\}\ Re\{a''\_pos\})(Re\{a\_pos\}Im\{a\_pos\})<0)$ c__pos+=1;
else
　　a''__neg=a__neg;
　　a__neg *=P'(n)
　　if $((Re\{a''\_neg\}\ Re\{a''\_neg\})(Re\{a\_neg\}Im\{a\_neg\})<0)$ c__neg+=1;

$a\_tot = (a\_pos\ \exp\{-j(c\_pos\ \mathrm{mod}\ 4)\pi/2\}) \cdot (a_{13}\ \mathrm{neg}\ \exp\{j(c_{13}\ \mathrm{neg}/\mathrm{mod}\ 4)\pi/2\})$;

$\mathrm{tot} = 2(Im\ a\_\mathrm{tot} > 0) - 1$;

$\mathrm{Ave}\{e_P(n)\} = (\angle(a\_\mathrm{tot}\ \exp\{-j\ \mathrm{tot}\ \pi/4\}) + (c\_\mathrm{pos} - c\_\mathrm{neg} + \mathrm{tot}/2)\pi/2)/(N/L)$;

Using knowledge of the sampling rate, this average phase angle error can be converted to the required estimate of the frequency offset. Note that this is done to minimize number of phase ($\angle$) calculations, because the arctan operation is expensive on a DSP as used in the preferred embodiment.

Thus the parameter in the second set, frequency offset, is determined from the estimate of the parameter of the first set, alignment, together with the m received signals, the known finite alphabet characteristics of the sent signal by minimizing a cost function J.

When this estimate is used to correct signals for frequency offset during demodulation, the average phase angle itself is used rather than the frequency offset estimate.

From the foregoing description, it thus will be evident that the present invention provides for a method for determining communication system parameters, such parameters including one or more of frequency offset, time alignment, and the spatial processing weight vector.

E. Apparatus for Parameter Determination

The architecture of the preferred embodiment of the apparatus of the present invention as shown in FIG. 1 is now described in more detail. The m outputs 103.1, 103.2, ..., 103.m (m=4 in the preferred embodiment) of the m antennas 101.1, 101.2, ..., 101.m are received and mixed down in analog in three stages from the carrier frequency (around 1.9 GHz) to a final intermediate frequency (IF) of 384 UHz. This is carried out in the m RX blocks 105.1, 105.2, ..., 105.m to generate signals 107.1, 107.2, ..., 107.m, which then are digitized (sampled) at 1.536 MHz by A/D converters 109.1, 109.2, ..., 109.m to produce real valued signal 111.1, 111.2, ..., 111.m. Final down-converting to baseband is carried out digitally by blocks 113.1, 113.2, ..., 113.m which are GrayChip Inc. GC2011A digital filter devices. The downconverters also carry out the time demultiplexing to produce four outputs. Taking for example, the first downconverter 113.1, its outputs are 115.1.0, 115.1.1, 115.1.2 and 115.1.4, one output for each of the receive time slots 0, 1, 2 and 3. Each of the timeslot signals also is scaled by each of the downconverters, the scaling as required for further processing. How to carry out such scaling for signal processing would be clear to one of ordinary skill in the art. Thus, for any timeslot, m signals are produced, and these are $z_1(t), z_2(t), \ldots, z_m(t)$, the complex valued responses of the first, second, ..., m'th antenna elements, respectively. For the 0'th time slot, these are shown as signals 115.1.0, 115.2.0, 115.3.0, and 115.4.0

Thus, for any timeslot, the apparatus comprises a receiver for each of the m antennas, each receiver including a digitizer, the outputs of the m receivers being the responses of the corresponding antenna elements. RX blocks 103, A/D blocks 109 and downconverter blocks 113 together are the m receivers in the particular embodiment, and any other receiving arrangement might be substituted.

For the apparatus to operate, the communication system needs to include a transmitter to transmit a signal of known characteristics to a base station, for example, a SYNCH pulse. Any remote terminal of the system would is be programmed to send such a signal to the base station.

For any timeslot, in one mode, processing to determine the initial weight matrix, frequency offset and time alignment parameters, and in a second mode, processing to provide frequency offset and alignment determination, frequency offset and alignment correction, and demodulation is carried out by a digital signal processor, one for each timeslot. The four DSPs for the four receive time slots 0, 1, 2 and 3 are shown as blocks 117.0, 117.1, 117.2, and 117.3, respectively. Each is a Motorola, Inc., DSP56301. The resulting demodulated signals are shown as 119.0, ..., 119.3.

Thus the apparatus includes an apparatus initial weight matrix, frequency offset and time alignment parameter determination.

Although this invention has been described in terms of minimizing cost functions, it would be clear to one in the art that this is equivalent to maximizing other related cost functions. Thus, any mention of a minimization step may in general be interpreted to be either a minimizing or a maximizing step.

Although this invention has been described with respect to preferred embodiments, those embodiments are illustrative only. No limitation with respect to the preferred embodiments is intended or should be inferred. It will be observed that numerous variations and modifications may be affected without departing from the true spirit and scope of the novel concept of the invention, and it is intended that the scope of the invention be defined by the claims appended hereto.

What is claimed is:

1. In a communication system comprising at least one remote terminal and a base station, the base station having an antenna array of m antenna elements, the communication system having a set of one or more parameters, said set consisting of a first set of parameters already estimated and a second set of parameters to be estimated, a method for determining an estimate of one or more parameters of the second set, the method comprising:
　　a) transmitting a first signal of known characteristics;
　　b) receiving said first signal at the base station as a first plurality of m received signals at m corresponding antenna elements;
　　c) determining a cost function that is related to the at least one or more parameters of the second set, said determining including:
　　　　i) forming a copy signal from samples of the signals of the first plurality of received signals using a weight vector,
　　　　ii) if the first set is not empty, obtaining estimates of one or more parameters of the first set, and
　　　　iii) using the known characteristics of the first signal; and
　　d) selecting as the estimate of the one or more parameters of the second set, the values of the one or more parameters of the second set that minimize the cost function.

2. The method of claim 1 wherein the first signal is a subset of a SYNCH burst and the known characteristics include the format of the subset of the SYNCH burst.

3. The method of claim 2 wherein the subset is the SYNCH burst.

4. The method of claim 2 wherein the subset is one or more prescribed fixed portions of the SYNCH signal.

5. The method of claim 1 wherein said first set is empty and said second set includes the time alignment of said system.

6. The method of claim 5 wherein said cost function is a quadratic cost function of the copy signal and a reference signal determined from the known characteristics of the first signal.

7. The method of claim 6 wherein said copy signal is of the amplitudes of samples of said received signals, and the reference signal is related to the amplitude of samples of said subset.

8. The method of claim 6 wherein said copy signal is of squared amplitudes of samples of said received signals, and the reference signal is related to the squared amplitude of samples of said subset.

9. In a communication system comprising at least one remote terminal and a base station, the base station having an antenna array of m antenna elements, the communication system having a set of one or more parameters, a method for determining an estimate of one or more parameters of the set, the method comprising:

a) transmitting a first signal of known characteristics;
  b) receiving said first signal at the base station as a first plurality of m received signals at m corresponding antenna elements;
  c) determining a cost function that is related to the at least one or more parameters of the set, said cost function being a function of (i) a copy signal related to samples of the signals of the first plurality of received signals, and (ii) a reference signal determined from the known characteristics of the first signal; and d) selecting as the estimate of the one or more parameters of the set, the values of the one or more parameters of the set that minimize the cost function.

10. The method of claim 9 wherein the first signal is a subset of a SYNCH burst and the known characteristics include the format of the subset of the SYNCH burst.

11. The method of claim 9 wherein said cost function is a quadratic cost function.

12. The method of claim 10 wherein said one or more parameters is the time alignment, the copy signal is of the amplitudes of said received signals, and the reference signal is related to the amplitude of said subset.

13. The method of claim 10 wherein said one or more parameters is the time alignment, said copy signal is of the squared amplitudes of said received signals, and the reference signal is related to the amplitude of said subset.

14. In a communications system comprising at least one remote terminal and at least one base station, each of said at least one base stations having m antenna elements, a method for estimating the time alignment of the communications system, the method comprising:

a) transmitting a first signal of known characteristics;
  b) receiving said first signal as a first plurality of m received signals at m corresponding antenna elements;
  c) calculating a minimum cost function for each time alignment of a set of time alignments, said minimum cost function calculating comprising determining the weight vector that minimizes a cost function of the error between a reference signal and a copy signal, the reference signal determined from the known characteristics of said first signal and the copy signal being of samples of the signals of said first plurality of received signals, the copy signal calculated using said weight vector, the copy signal and the reference signal shifted in time relative to each other by said each time alignment, the minimum cost function being the cost function using said calculated weight vector; and
  d) selecting the time alignment estimate as the time alignment of said set of time alignments which has the lowest minimum cost function.

15. The method of claim 14 wherein the first signal is a subset of a SYNCH burst and the known characteristics include the format of the subset of the SYNCH burst.

16. The method of claim 14 wherein said cost function is a quadratic cost function.

17. The method of claim 16 wherein the copy signal is of the amplitudes of samples of said received signals, and the reference signal is related to the amplitude of said subset.

18. The method of claim 16 wherein the copy signal is of samples of the amplitudes of said received signals, and the reference signal is related to the amplitude squared of said subset.

19. The method of claim 18 wherein the minimization of the cost function is by use of a pseudoinverse process.

20. The method of claim 18 wherein the minimization of the cost function is by use of a conjugate gradient method.

21. The method of claim 18 wherein adaptive normalization is used at each step of the minimization.

22. The method of claim 1 wherein said first set includes time alignment and said second set includes the frequency offset of said system.

23. The method of claim 22 wherein said cost function is a function of the error between said copy signal and a reference signal, the reference signal formed from samples of said first signal.

24. The method of claim 23 wherein said cost function includes a correction of the timing of the copy signal relative to the timing of the samples of said first signal, said correction using the already determined estimate of time alignment in said first set.

25. The method of claim 23 wherein said cost function is a quadratic cost function of said error.

26. The method of claim 24 wherein said cost function is a quadratic cost function of said error.

27. The method of claim 25 wherein the minimization of the cost function is by use of a pseudoinverse process.

28. The method of claim 25 wherein the minimization of the cost function is by use of a conjugate gradient method.

29. The method of claim 26 wherein the minimization of the cost function is by use of a pseudoinverse process.

30. The method of claim 26 wherein the minimization of the cost function is by use of a conjugate gradient method.

31. The method of claim 25 wherein adaptive normalization is used at each step of the minimization.

32. The method of claim 25 wherein the reference signal is a frequency-offset replica of samples of said first signal, the shift being one of a set of frequency offsets.

33. The method of claim 32 wherein initially the offsets of said set of frequency offsets are separated by a frequency interval, and wherein said step of selecting comprises:

a) determining the weight vector and frequency offset that minimizes said cost function, said weight vector the minimizing weight vector, said frequency offset the minimizing frequency offset;
  b) if the desired accuracy has not been obtained, repeating step d) at least once, with a new set of frequency offsets, the offsets of the new set centered around the most recent previous minimizing frequency offset, the offsets of the new set separated by a new interval less than the most recent previous frequency interval, said repeating until the desired accuracy has been obtained; and c) choosing as the estimate of the estimate of the frequency offset the last obtained minimizing frequency offset.

34. The method of claim 33 wherein said second set includes the weight vector and wherein said step of selecting includes choosing as the estimate of the weight vector the last obtained minimizing weight vector.

35. The method of claim 9 wherein said set includes the frequency offset of said system.

36. The method of claim 35 wherein said cost function is a function of the error between said copy signal and the reference signal, the reference signal formed from samples of said first signal.

37. The method of claim 36 wherein said cost function is a quadratic cost function of said error.

38. The method of claim 37 wherein the minimization of the cost function is by use of a pseudoinverse process.

39. The method of claim 37 wherein the minimization of the cost function is by use of a conjugate gradient method.

40. The method of claim 37 wherein adaptive normalization is used at each step of the minimization.

41. The method of claim 37 wherein the reference signal is a frequency-offset replica of samples of said first signal, the shift being one of a set of frequency offsets.

42. The method of claim 40 wherein initially the offsets of said set of frequency offsets are separated by a frequency interval, and wherein said step of selecting comprises:

a) determining the weight vector and frequency offset that minimizes said cost function, said weight vector the minimizing weight vector, said frequency offset the minimizing frequency offset;

b) if the desired accuracy has not been obtained, repeating step d) at least once, with a new set of frequency offsets, the offsets of the new set centered around the most recent previous minimizing frequency offset, the offsets of the new set separated by a new interval less than the most recent previous frequency interval, said repeating until the desired accuracy has been obtained; and c) choosing as the estimate of the frequency offset the last obtained minimizing frequency offset.

43. The method of claim 42 wherein said second set includes the weight vector and wherein said step of selecting includes choosing as the estimate of the weight vector the last obtained minimizing weight vector.

44. The method of claim 1 wherein the first set is empty and the second set includes the time alignment of the system.

45. The method of claim 1 wherein the first set is empty, the second set includes the time alignment of the system, said first signal modulated by a modulation scheme with a finite alphabet property, and the known characteristics including the modulation scheme.

46. The method of claim 45 wherein the symbols of the finite alphabet all differ in phase.

47. The method of claim 46 wherein the modulation scheme is DPSK, DPSK representable by a set of differential constellation points in the complex plane.

48. The method of claim 47 wherein said received signals and said copy signal are representable by complex values, the cost function is a monotonic function of the errors between a time shifted differential signal and the closest ideal differential signal to said time shifted differential signal, the differential signal defined as having a phase difference between subsequent samples equal to the phase difference between subsequent samples of the copy signal, said samples separated by the baud period, said error at any point in time being the distance in the complex plane between the differential signal and the nearest differential constellation point of said modulation scheme, said time shift by a predefined amount, said minimization determining the time shift that minimizes said cost function, the estimate of time alignment being the time shift that minimizes said cost function.

49. The method of claim 48 wherein said cost function is the sum of the squares of the errors.

50. In a communications system comprising at least one remote terminal and a base station, the base stations having a plurality of antenna elements, in which successful communication between the base station and a remote terminal requires that common channel timing and frequency be established, a method for establishing common channel timing and frequency by estimating a second set of parameters from a first set of estimated parameters, the method comprising:

a) transmitting a modulated signal with known finite alphabet properties, said modulated signal modulated by a DPSK modulation scheme;

b) receiving the transmitted signal at the plurality of antenna elements and producing a down-converted complex representation of each received signal as a received signal vector;

c) estimating the transmitted signal using a signal copy operation with an initial spatial weight vector;

d) creating a time sampled representation, $b_0(n)$, of $\hat{s}_0(t)$;

e) forming a differential stream, $$d_0(n) = b_0(n)/b_0(n-L)$$
$$\angle d_0(n) = \angle b_0(n) - \angle b_0(n-L)$$

where L is the baud interval and $\angle(.)$ represents a phase angle of an associated argument;

f) computing a time alignment squared error $e_A^2(n) = |d_0(n) - d_{0ideal}(n)|^2$ as $e_A^2(n) = (|x_{Re}(n)| - 1/\sqrt{2})^2 + (|jx_{Im}(n)| - 1/\sqrt{2})^2$ where $d_{0idea}(n)$ is the closest ideal complex value ($\pm\angle\pi/4$ or $\pm\angle 3\pi/4$) to $d_0(n)$, and $[b_0(n)b_0^*(n-L)] = x_{Re}(n) + jx_{Im}(n)$; and g) minimizing a cost function $J_x$ with respect to offset index x where $$J_x = \sum_{k=1}^{N/L} e_A^2(x+kL), \text{ for } x = 0, 1, ..., (L-1),$$

and N is the total number of samples in $d_0(n)$, selecting the estimated time offset parameter to be the value of x that minimizes $J_x$.

51. The method of claim 50 further comprising steps for a frequency offset parameter estimation, the steps comprising:

a) applying the estimated offset parameter as a correction to $d_0(n)$ and $d_{0ideal}(n)$ and producing corresponding time aligned signals $d'_0(n)$ and $d'_{0ideal}(n)$, respectively, and corresponding phase error of $e_P(n) = \angle d'_0(n) - \angle d'_{0ideal}(n)$;

b) minimizing a phase error cost function, $J_P$, with respect to $\angle d'_0(n)$ by rotating $\angle d'_0(n)$, where $J_P$ is an average of $e_P(n)$ over all samples to obtain $\angle d'_{0min}(n)$, a phase offset that minimizes $J_P$; and c) computing a frequency offset by dividing phase angle $\angle d'_{0min}(n)$ by a time increment corresponding to increments of time index n.

52. An apparatus for determining an estimate of one or more parameters of a communication system, the system comprising at least one remote terminal and a base station, the base station having an antenna array of m antenna elements and m corresponding receivers, the communication system having a set of one or more parameters, said set consisting of a first set of parameters already estimated and a second set of parameters to be estimated, the apparatus comprising:

a) means for transmitting a first signal of known characteristics, said first signal received at the base station as a first plurality of m received signals at m corresponding antenna elements and receivers;

b) means for determining a cost function that is related to said at least one or more parameters of the second set, said determining means including         i) signal copy means coupled to said receivers for determining a copy signal from samples of the signals of the first plurality of received signals using a weight vector,         ii) means for storing parameters of the first set, and         iii) means for storing the known characteristics of the first signal; and     c) calculating means coupled to cost function determining means for selecting as the estimate of the one or more parameters of the second set, the values of the one or more parameters of the second set that minimize the cost function.

* * * * *